(12) United States Patent
Dynin

(10) Patent No.: US 9,177,063 B2
(45) Date of Patent: Nov. 3, 2015

(54) ENDORSING SEARCH RESULTS

(71) Applicant: Google Inc., Mountain View, CA (US)

(72) Inventor: Misha Dynin, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/304,571

(22) Filed: Jun. 13, 2014

(65) Prior Publication Data

US 2014/0297615 A1    Oct. 2, 2014

Related U.S. Application Data

(63) Continuation of application No. 10/879,592, filed on Jun. 30, 2004, now Pat. No. 8,825,639.

(51) Int. Cl.
*G06F 17/30* (2006.01)

(52) U.S. Cl.
CPC .... *G06F 17/30864* (2013.01); *G06F 17/30867* (2013.01)

(58) Field of Classification Search
CPC .................... G06F 17/30592; G06F 17/30595; G06Q 10/10
USPC .......... 707/1/1, 600, 101, 200, 724, 733, 706; 705/4, 1, 10
See application file for complete search history.

(56) References Cited

U.S. PATENT DOCUMENTS

| 6,006,222 A | 12/1999 | Culliss |
| 6,014,665 A | 1/2000 | Culliss |
| 6,078,916 A | 6/2000 | Culliss |
| 6,138,128 A | 10/2000 | Perkowitz |
| 6,182,068 B1 | 1/2001 | Culliss |
| 6,185,559 B1 | 2/2001 | Brin |
| 6,256,648 B1 | 7/2001 | Hill |
| 6,266,649 B1 | 7/2001 | Linden |
| 6,285,999 B1 | 9/2001 | Page |
| 6,389,372 B1 | 5/2002 | Glance |
| 6,405,175 B1 | 6/2002 | Ng |
| 6,463,430 B1 * | 10/2002 | Brady et al. .......................... 1/1 |
| 6,526,440 B1 | 2/2003 | Bharat |
| 6,529,903 B2 | 3/2003 | Smith |
| 6,594,673 B1 | 7/2003 | Smith |
| 6,615,209 B1 | 9/2003 | Gomes |

(Continued)

FOREIGN PATENT DOCUMENTS

| JP | 11265369 A | 9/1999 |
| JP | 2002132604 A | 5/2002 |

(Continued)

OTHER PUBLICATIONS

Daivd Sullivan. Eurekster Launches Personalized Social Search. Jan. 21, 2004.*

(Continued)

*Primary Examiner* — Mariela Reyes
*Assistant Examiner* — Thong Vu
(74) *Attorney, Agent, or Firm* — Fish & Richardson P.C.

(57) ABSTRACT

Methods and systems for improving user search experience with a search engine by providing a way for associated users to create and share personalized lists of article identifiers through endorsements of articles. Search endorsements can be used to personalize the search engine's ranking of articles by offering a way for users to re-rank the article identifiers for themselves and for those who trust them.

22 Claims, 8 Drawing Sheets

(56) References Cited

U.S. PATENT DOCUMENTS

| | | | |
|---|---|---|---|
| 6,647,383 | B1* | 11/2003 | August et al. ............... 1/1 |
| 6,658,423 | B1 | 12/2003 | Pugh |
| 6,678,681 | B1 | 1/2004 | Brin |
| 6,725,259 | B1 | 4/2004 | Bharat |
| 6,754,873 | B1 | 6/2004 | Law |
| 6,947,924 | B2 | 9/2005 | Bates |
| 7,827,176 | B2 | 11/2010 | Korte |
| 2001/0047270 | A1* | 11/2001 | Gusick et al. ............ 705/1 |
| 2002/0002600 | A1 | 1/2002 | Yamada |
| 2002/0027567 | A1 | 3/2002 | Niamir |
| 2002/0042791 | A1 | 4/2002 | Smith |
| 2002/0092019 | A1* | 7/2002 | Marcus ................. 725/37 |
| 2002/0107859 | A1* | 8/2002 | Tsuyuki ............... 707/100 |
| 2002/0116466 | A1 | 8/2002 | Trevithick |
| 2002/0120609 | A1 | 8/2002 | Lang |
| 2002/0123988 | A1 | 9/2002 | Dean |
| 2002/0124053 | A1 | 9/2002 | Adams |
| 2002/0133481 | A1 | 9/2002 | Smith |
| 2003/0014428 | A1* | 1/2003 | Mascarenhas ........ 707/200 |
| 2003/0046098 | A1 | 3/2003 | Kim |
| 2003/0050977 | A1 | 3/2003 | Puthenkulam |
| 2004/0019584 | A1 | 1/2004 | Greening et al. |
| 2004/0034631 | A1 | 2/2004 | Julliard |
| 2004/0042599 | A1 | 3/2004 | Zaner |
| 2004/0059708 | A1 | 3/2004 | Dean |
| 2004/0088325 | A1 | 5/2004 | Elder |
| 2004/0119740 | A1 | 6/2004 | Chang |
| 2004/0122803 | A1 | 6/2004 | Dom |
| 2004/0122811 | A1 | 6/2004 | Page |
| 2004/0148201 | A1* | 7/2004 | Smith et al. .............. 705/4 |
| 2005/0120006 | A1 | 6/2005 | Nye |
| 2005/0234952 | A1* | 10/2005 | Zeng et al. ............ 707/101 |
| 2005/0256866 | A1 | 11/2005 | Lu |
| 2006/0004713 | A1 | 1/2006 | Korte |
| 2006/0277091 | A1* | 12/2006 | Kochikar et al. ........ 705/10 |
| 2011/0040741 | A1 | 2/2011 | Korte |

FOREIGN PATENT DOCUMENTS

| | | | |
|---|---|---|---|
| WO | WO0068860 | A1 | 5/2000 |
| WO | WO0077689 | A1 | 12/2000 |
| WO | WO03081483 | A1 | 10/2003 |

OTHER PUBLICATIONS

Eatability.com 2003, http://web.archive.org/web/20031026121912/http://www.eatability.com.au/.*

"Judy's Book Beta Your Friends' Yellow Pages", [online] 2pp., [Retrieved on May 31, 2005], Retrieved from the Internet: http://www.judysbook.com.

"Multiply Privacy Policy" [online] 4pp. [Retrieved on May 3, 2004], Retrieved from the Internet: http://multiply.com/info/privacy.

"Multiply Terms of Service" [online] 6pp. [Retrieved on May 3, 2004], Retrieved from the Internet: http://multiply.com/info/tos.

"Multiply-About Multiply" [online] 2pp. [Retrieved on May 3, 2004], Retrieved from the Internet: http://multiply.com/info/about.

"Multiply-About Multiply-Help" [online] 2pp. [Retrieved on May 3, 2004], Retrieved from the Internet: http://multiply.com/info/help.

"Yelp. Real People. Real Reviews.™", [online] 4pp., [Retrieved on May 31, 2005], Retrieved from the Internet: http://www.yelp.com.

Adamic et al., "A social network caught in the Web", [online], [retrieved on Jul. 28, 2004], 29pp., Retrieved from the Internet: http://frrstrnonday.org/issues/issue8_6/adamic/.

Brin et al., "The Anatomy of a Large-Scale Hypertextual Web Search Engine", 20pp., Computer Science Department, Stanford University, Stanford, CA, not dated.

Doctorrow, C., "Running notes from Revenge of the User: Lessons from Creator/User Battles" [online], [retrieved on Jul. 28, 2004], 5pp., Retrieved from the Internet: http://craphound.com/danahetcon04.txt.

Harper, Phillip, "Is Friendster the "Next Big Thing"?, Why millions are jumping on this online bandwagon" [online], [retrived on Jul. 29, 2004], 2pp., Retrieved from the Internet: http://mobilernomentum.rnsn.coniarticle.aspx?aid=4.

Listings—Tribenet [online], [retrieved Jun. 28, 2004], 2pp., Retrieved from the Internet: http://www.tribe.net/tribe/servlet/template/pub,Listings.Vm.

Rotten Tomatoes http://web.archive.org/web/20040216095605/www.rottentomatoes.com/m/MonaLisaSmile-1128264/.

Sullivan, Danny, "Is It Really Personalized Search?", [online] 5pp. [Retrieved on May 13, 2004], Retrieved from the Internet: http://www.searchenginewatch.com.

Sullivan, Danny, "Eurekster Launches Personalized Social Search," Jan. 21, 2004, http://www.searchenginewatch.com.

"Judy's Book Beta Your Friends Yellow Pages", [online] 5 pp. [Retrieved on May 31, 2005], Retrieved from the Internet: www.judysbook.com.

Eatability.com, 2003, http://web.archive.org/web/20031026121912/http://www.eatability.com.au/.

Supplementary European Search Report in European Application No. 05749584.8, dated Nov. 2, 2009, 2 pages.

Response to Office Action in European Application No. 05749584.8, Dated Mar. 31, 2010, 20 pages.

* cited by examiner

ENDORSING SEARCH RESULTS

CROSS-REFERENCE TO RELATED APPLICATIONS

This application is a continuation of U.S. application Ser. No. 10/879,592 filed Jun. 30, 2004, which is related to co-pending U.S. Utility Patent Application Ser. No. 10/879,591, filed Jun. 30, 2004, the contents of each of which are incorporated by reference.

BACKGROUND OF THE INVENTION

1. Field of the Invention

The present invention relates generally to methods and systems for searching. For example, embodiments of the present invention relate generally to methods and systems for using member networks to improve a user's search experience with a search engine.

2. Background

A conventional search engine, such as the Google™ search engine, returns a result set in response to a search query submitted by a user. The search engine performs the search based on a conventional search method. For example, one known method, described in an article entitled "The Anatomy of a Large-Scale Hypertextual Search Engine," by Sergey Brin and Lawrence Page, assigns a degree of importance to a document, such as a web page, based on the link structure of the web page. The search engine ranks or sorts the individual articles or documents in the result set based on a variety of measures. For example, the search engine may rank the results based on a popularity score. The search engine generally places the most popular results at the beginning of the result set.

Conventional websites (also written as "Web sites") such as those hosted on Yahoo!™, Tribe™, Tickler™, or other web sites, allow users to form communities and groups and other member networks. The member networks on conventional websites allow members of the group to communicate with each other and list announcements associated with the community. Generally, conventional web sites do not connect the member networks with search engines and enable members of such networks to endorse or recommend search results to one another.

SUMMARY OF THE INVENTION

Embodiments of the present invention provide methods and systems for members of a member networks to endorse or recommend to other members or users the desired articles for particular search queries. In one embodiment of the present invention, there is provided a method comprising: receiving profiles of users in a member network, wherein the profiles comprise endorsement information of articles, receiving a search query, and providing articles relevant to the search query, wherein at least one of the articles is endorsed based on the endorsement information.

In another embodiment of the present invention, there is provided a method comprising: receiving a first user profile in a member network created by a first user; receiving a first search query submitted by the first user; returning from a search engine to the first user a search result set relevant to the first search query, the search result set includes one or more links for endorsing articles identified in the search result set; receiving from the first user an endorsement for one of the articles identified in the search result set; storing the endorsement in a member network database; receiving a second user profile in the member network created by a second user; receiving a second search query submitted by the second user that is substantially identical or relevant to the first search query; returning from the search engine a second search result set relevant to the second search query; returning from the member network database a third search result set relevant to the second search query; and merging the second search result set with the third search result set to provide the second user with a final search result set identifying one or more endorsed articles for the second search query.

The aforementioned embodiments are mentioned not to limit or define the invention, but to provide an example of embodiments of the invention to aid understanding thereof. Such exemplary embodiments are discussed in the Detailed Description, and further description of the invention is provided there. Advantages offered by the various embodiments of the present invention may be further understood by examining this specification.

BRIEF DESCRIPTION OF THE DRAWINGS

The embodiments of the present invention are illustrated by way of example in, and not limited to, the following figures.

DETAILED DESCRIPTION

Overview

Embodiments of the present invention provide methods and systems for members of a member networks to endorse or recommend to other members or users an article or articles for search queries. In one embodiment, the method begins with a user signing up to become a member of a member network. After becoming a member, the user can endorse or recommend an article or articles. When an endorsed article identifier appears in a result set relevant to a search query, the article identifier can have associated endorsement data. Further, as a member, the user can submit user queries to the search engine and receive lists of article identifiers that include endorsed article identifiers (i.e., article identifiers representing endorsed articles) from other members of the member network. Each list of article identifiers in a search result set can be re-ordered or re-ranked to reflect those endorsed article identifiers within the list. Thus, the search endorsements can be used to improve the search engine's ranking of articles by offering a way for users to re-rank the articles for themselves and for those who trust them.

System Architecture

Figure 1:
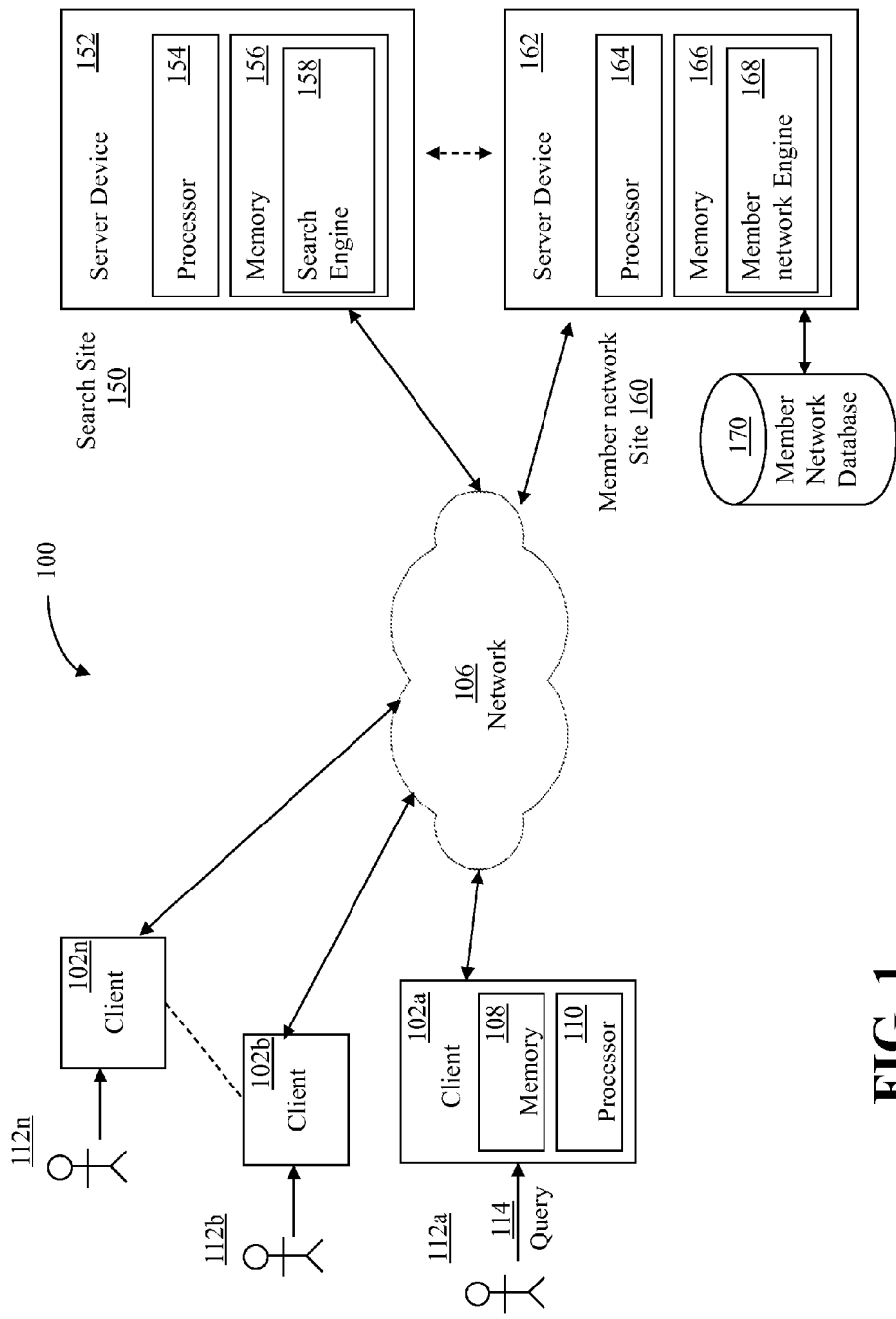
FIG. 1 is a block diagram illustrating an exemplary environment in which embodiments of the present invention may operate.

Various systems in accordance with the present invention may be constructed. FIG. 1 is a block diagram illustrating an exemplary system in which embodiments of the present invention can operate. The present invention may operate, and be embodied, in other systems as well.

Referring now to the drawings in which like numerals indicate like elements throughout the several figures, FIG. 1 is a block diagram illustrating an exemplary system in accordance with an exemplary embodiment of the present invention. The system 100 shown in FIG. 1 includes multiple client devices 102a-n with users 112a-112n in communication with a search site 150 and a member network site 160 over a network 106. The search site 150 and the member network site 160 are also in communication with each other directly (as shown by the dashed line) or through the network 106. The network 106 can be a wired or wireless network. Further, it can be a public network, e.g., the Internet, or a private data network, e.g., a local area network (LAN) or a wide area network (WAN). Moreover, methods according to the present invention may operate within a single computer.

Each of the client devices 102a-n includes a memory 108, which can be a computer-readable medium (CRM), such as a random access memory (RAM), coupled to a processor 110. The processor 110 executes computer-executable program instructions stored in the client device, such as memory 108, as program code. Such processor may include a microprocessor, an ASIC, and state machines. Such processors include, or may be in communication with, media, for example computer-readable media, which stores instructions that, when executed by the processor, cause the processor to perform the methods described herein. Moreover, the processor 110 can be any of a number of computer processors, such as processors from Intel Corporation of Santa Clara, Calif. and Motorola Corporation of Schaumburg, Ill. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, switch, private or public network, or other transmission device or channel, both wired and wireless. The instructions may include code from any suitable computer-programming language, including, for example, C, C++, C#, Visual Basic, Java, Python, Perl, and JavaScript.

Client devices 102a-n can also include a number of external or internal devices such as a mouse, a CD-ROM drive, a DVD drive, a keyboard, a display, or other input or output devices. Examples of client devices 102a-n are personal computers, digital assistants, personal digital assistants (PDAs), cellular phones, mobile phones, smart phones, pagers, digital tablets, laptop computers, Internet appliances, and other processor-based devices. In general, the client devices 102a-n can be any type of processor-based platform that operates on any operating system capable of supporting one or more client application programs. Client devices 102a-n may operate on any operating system capable of supporting a browser or browser-enabled application, such as Microsoft® Windows® or Linux. The client devices 102a-n shown include, for example, personal computers executing a browser application program such as Microsoft Corporation's Internet Explorer™, Netscape Communication Corporation's Netscape Navigator™, and Apple Computer, Inc.'s Safari™.

Through the client devices 102a-n, users 112a-n can communicate over the network 106 with each other and with other sites, systems and devices coupled to the network 106. As shown in FIG. 1, a search site 150 and a member network site 160 are also coupled to the network 106.

The search site 150 shown includes a server device 152 executing a search application program, also known as a member network engine 168. The member network engine 168 allows users, such as user 112a, to interact with and participate in a member network. A member network can refer to a computer network connecting entities, such as people or organizations, by a set of social relationships, such as friendship, co-working, or information exchange. Of course, a member network can refer to a computer application or data connecting such entities by such social relationships. Examples of member networks include Orkut.com and Friendster.com.

Member networks can comprise any of a variety of suitable arrangements. An entity or member of a member network can have a profile and that profile can represent the member in the member network. The member network can facilitate interaction between member profiles and allow associations or relationships between member profiles. Associations between member profiles can be one or more of a variety of types, such as friend, co-worker, family member, business associate, common-interest association, and common-geography association. Associations can also include intermediary relationships, such as friend of a friend, and degree of separation relationships, such as three degrees away.

Associations between member profiles can be reciprocal associations. For example, a first member can invite another member to become associated with the first member and the other member can accept or reject the invitation. A member can also categorize or weigh the association with other member profiles, such as, for example, by assigning a level to the association. For example, for a friendship-type association, the member can assign a level, such as acquaintance, friend, good friend, and best friend, to the associations between the member's profile and other member profiles. In one embodiment, the member network engine 168 can determine the type of association between member profiles, including, in some embodiments, the degree of separation of the association and the corresponding weight or level of the association.

Similar to the client devices 102a-n, the server device 152 shown includes a processor 154 coupled to a CRM 156. Server device 152, depicted as a single computer system, may be implemented as a network of computer processors. Examples of the server device 162 are servers, mainframe computers, networked computers, a processor-based device, and similar types of systems and devices. The server processor 154 can be any of a number of computer processors, such as processors from Intel Corporation of Santa Clara, Calif. and Motorola Corporation of Schaumburg, Ill.

Memory 156 contains a search application program, also known as a search engine 158. The search engine 158 locates relevant information in response to a search query from one of the client devices 102a-n, e.g., the client device 102a. In the embodiment shown, the server device 152, or related devices, has previously performed a crawl of the network 106 to locate articles, such as web pages, stored at other devices or systems coupled to the network 106, and indexed the articles in an article index for storage in memory 156 or another data storage device. Thus, the search engine 158 can locate relevant information by accessing the article index in response to a search query. The search engine 158 then provides a result set to the client device 102a via the network 106. The result set comprises one or more identifiers of articles that are relevant to the search query. Articles include, for example: word processor, spreadsheet, presentation, e-mail, instant messenger, database, and other client application program content files or groups of files; web pages of various formats (e.g., HTML, XML, XHTML); portable document format (PDF) files; audio files; video files; or any other documents or groups of documents or information of any type whatsoever. An article identifier may be, for example, a uniform resource locator (URL), a uniform resource identifier (URI), a file name, a link, an icon, a path for a local file, or anything else that identifies an article.

The member network site 160 shown includes a member network database 170 and a server device 162 executing a member network engine application program. Similar to the client devices 102*a-n*, the server device 162 shown includes a processor 164 coupled to a CRM 166. The server device 162 is in communication with a member network database 170. Server device 162, depicted as a single computer system, may be implemented as a network of computer processors. Examples of the server device 162 are servers, mainframe computers, networked computers, a processor-based device, and similar types of systems and devices. The server processor 164 can be any of a number of suitable computer processors, such as processors from Intel Corporation of Santa Clara, Calif. and Motorola Corporation of Schaumburg, Illinois.

Memory 166 in the server device 162 contains a member network engine application program, also known as a member network engine 168. The member network engine 168 allows users, such as user 112*a*, to interact with and participate in a member network. A member network can refer to a computer network connecting people or organization by a set of relationships, such as social relationships like friendship, co-working, or information exchange. A member network can include profiles that can be associated with other profiles. Each profile may represent a member and a member can be, for example, a person, an organization, a business, a corporation, a community, a fictitious person, or other entity. Each profile can contain entries, and each entry can include information associated with a profile. Examples of entries for a person profile can include information regarding relationship status, birth date, age, children, ethnicity, religion, political view, sense of humor, sexual orientation, fashion preferences, smoking habits, drinking habits, pets, hometown location, passions, sports, activities, favorite books, music, TV, or movie preferences, favorite cuisines, email addresses, location information, IM name, phone number, address, skills, career, or any other information describing, identifying, or otherwise associated with a profile. Entries for a business profile can include market sector, customer base, location, supplier information, net profits, net worth, number of employees, stock performance, or other types of information associated with the business profile.

Additionally, entries within a profile can include associations with other profiles. Associations between profiles within a member network can include, for example, friendships, business relationships, acquaintances, community or group associations, activity partner associations, common interest associations, common characteristic associations, or any other suitable type of relationship connection (e.g., social relationship connection). Associations between profiles can also have various levels. For example, friendship levels can include, for example, a "haven't met" level, an "acquaintance" level, a "friend" level, a "good friend" level, a "best friend" level, and other suitable levels.

A degree of separation based on associations between profiles can also be determined. For example, a degree of separation can be determined based on the fewest number of associations between two profiles. Thus, if profile A is a friend of profile B, and profile B is a friend of profile C, there can be a degree of separation of two between profiles A and C. A degree of separation can be type specific or type neutral. Type specific degrees of separation only count relationships of a certain type. Thus, for example, in the case above where A is a friend of B, and B is a friend of C, there is a friendship degree separation of two, even if A is directly associated with C by a business association, which would otherwise produce a degree of separation of 1.

Moreover, each profile can also contain search endorsement entries, each entry can include information associated with an endorsed article. For example, a search endorsement entry can include a particular search query, one or more article identifiers for articles that the user has endorsed for the search query, and the kind of endorsement for each of the endorsed articles.

Server device 162 of the member network site 160 also provides access to storage elements, such as a member network storage element, in the example shown in FIG. 1, a member network database 170. The member network database 170 can be used to store profiles of members in a member network and to store communities within the member network as created by the member-network engine 168. Data storage elements may include any one or combination of methods for storing data, including without limitation, arrays, hash tables, lists, and pairs. Other similar types of data storage devices can be accessed by the server device 162. The member network engine 168 can receive data comprising the profiles and communities from the member-network database 170 and can also send data comprising communities and profiles to the member network database 170 for storage. The member-network database 170 may be physically attached or otherwise in communication with the member-network engine 168 by way of a network or other connection.

In operation, upon receiving a search query from a user, such as one of the users 112*a-n*, the search engine 158 locates relevant information in response to the search query. The search engine 158 then returns a first result set of one or more article identifiers relevant to the search query. The search engine 158 also communicates with the member network engine 168 to access the member network database 170, look up endorsement entries in member profiles that are associated with the user in a member network as further explained later, and to return a second result set of one or more endorsed article identifiers. The two search result sets are then merged to provide the user with a final search result set having article identifiers relevant to the search queries, with some article identifiers indicated as having been endorsed based on the second search result set. The final search result set also provides the user with an option to endorse one or more articles therein by endorsing their article identifiers and storing such endorsed article identifiers in the member profile. The methods for accomplishing these tasks are described below in the process section.

It should be noted that the present invention may include systems having different architecture than that which is shown in FIG. 1. For example, in some systems according to the present invention, server device 162 may include a single physical or logical server. The system 100 shown in FIG. 1 is merely exemplary, and is used to help explain the member networks and methods illustrated in subsequent figures.

Exemplary Member Network

Figure 2:
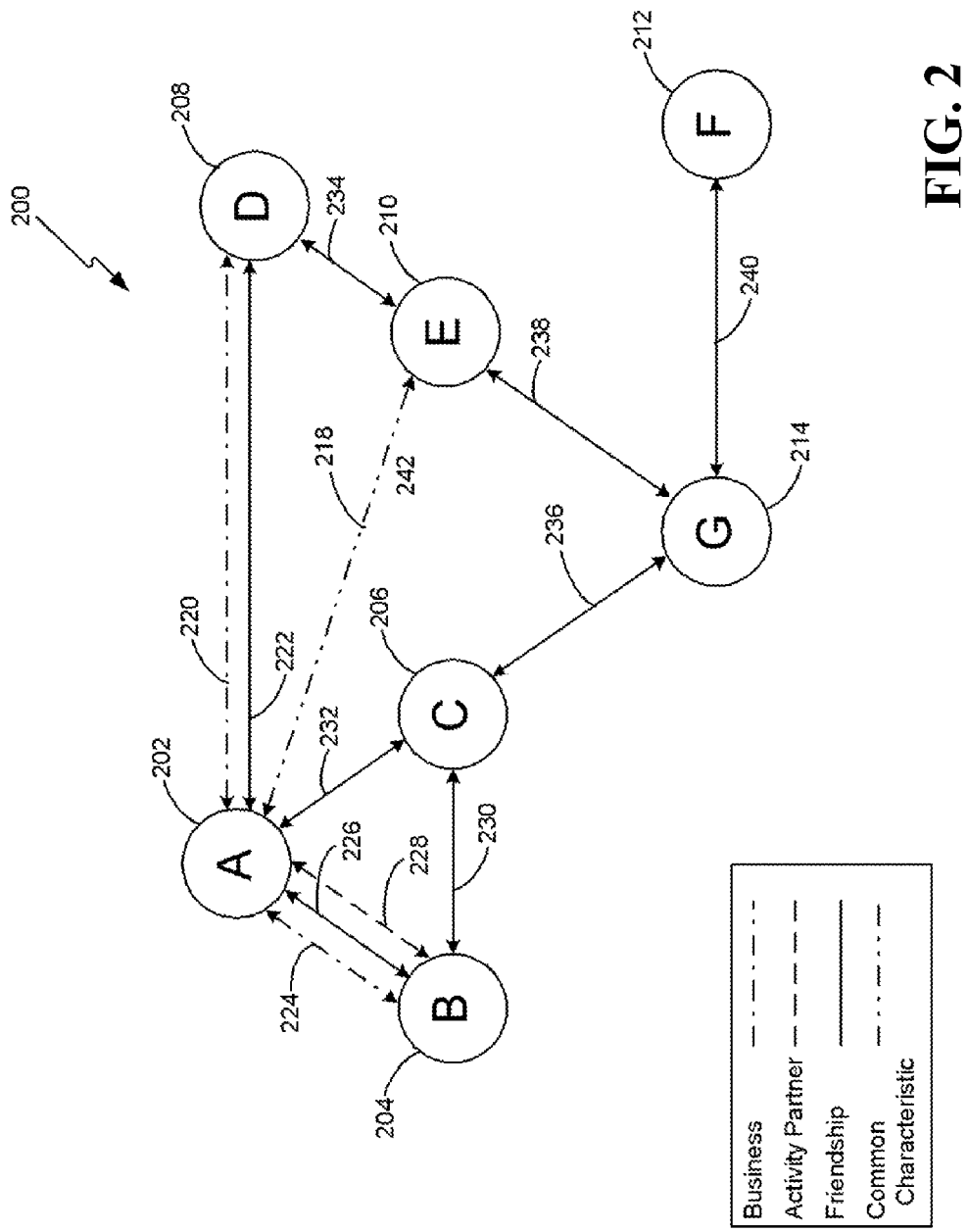
FIG. 2 depicts a diagram of a member network in accordance with an embodiment of the present invention.

FIG. 2 shows a diagram of a member network 200 according to one embodiment of the present invention. According to the embodiment illustrated in FIG. 2, the member network 200 is illustrated with a graph comprising vertices 202, 204, 206, 208, 210, 212, and 214 and edges 218, 220, 222, 224, 226, 228, 230, 232, and 234. The vertices 202, 204, 206, 208, 210, 212, and 214 comprise profiles A, B, C, D, E, F, and G, respectively. Each profile can represent a member profile of a member of the member network 200. The exemplary network 200 shown in FIG. 2 has seven members. Considerably more members can be part of the member network 200. A member can be an entity such as, for example, a person, an organization, a business, a corporation, a community, a fictitious person, or other suitable entity.

Each member profile can contain entries, and each entry can comprise information associated with a profile. For example, a person's member profile can contain: personal information, such as relationship status, birth date, age, children, ethnicity, religion, political view, sense of humor, sexual orientation, fashion preferences, smoking habits, drinking habits, pets, hometown location, passions, sports, activities, favorite books or music, TV or movie preferences, and favorite cuisines; contact information, such as email addresses, location information, instant messenger name, telephone numbers, and address; professional information, such as job title, employer, and skills; educational information, such as schools attended and degrees obtained, and any other suitable information describing, identifying, or otherwise associated with a person. A business' member profile can, for example, contain a description of the business, and information about its market sector, customer base, location, suppliers, net profits, net worth, number of employees, stock performance, contact information, and other types of suitable information associated with the business.

A member profile can also contain rating information associated with the member. For example, the member can be rated or scored by other members of the member network 200 in specific categories, such as humor, intelligence, fashion, trustworthiness, sexiness, and coolness. A member's category ratings can be contained in the member's profile. In one embodiment of the member network, a member can have fans. Fans can be other members who have indicated that they are "fans" of the member. Rating information can also include the number of fans of a member and identifiers of the fans. Rating information can also include the rate at which a member accumulated ratings or fans and how recently the member has been rated or acquired fans.

A member profile can also contain membership information associated with the member. Membership information can include information about a member's login patterns to the member network, such as the frequency that the member logs in to the member network and the member's most recent login to the member network. Membership information can also include information about the rate and frequency that a member profile gains associations to other member profiles. In a member network that comprises advertising or sponsorship, a member profile may contain consumer information. Consumer information may include the frequency, patterns, types, or number of purchases the member makes, or information about which advertisers or sponsors the member has accessed, patronized, or used.

A member profile may comprise data stored in memory. The profile, in addition to comprising data about the member, can also comprise data relating to others. For example, a member profile can contain an identification of associations or virtual links with other member profiles. In one embodiment, a member profile may comprise a hyperlink associated with another member's profile. In one such association, the other member's profile may contain a reciprocal hyperlink associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other member network members' profiles with which the member wishes to be associated.

An association may be designated manually or automatically. For example, a member may designate associated members manually by selecting other profiles and indicating an association that can be recorded in the member's profile. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits.

Associations between profiles within a member network can be of a single type or can be multiple types and can include, for example, friendship associations, business associations, family associations, community associations, school associations, or any other suitable type of link between profiles. Associations can further be weighted to represent the strength of the association. For example, a friendship association can be weighted more than a school association. Each type of association can have various levels with different weights associated with each level. For example, a friendship association can be classified according to which of a plurality of friendship association levels it belongs to. In one embodiment, a friendship association may be assigned a level by the member from a list of levels comprising: a best friend, a good friend, a regular friend, an acquaintance, and a friend the member has not met.

In FIG. 2, the edges 218, 220, 222, 224, 226, 228, 230, 232, and 234 shown comprise associations between profiles. According to the embodiment shown in FIG. 2, the member network 200 comprises a plurality of differing types of associations represented by edges 218, 220, 222, 224, 226, 228, 230, 232, and 234. The types of associations shown in FIG. 2 for illustration purposes are business associations, activity partner associations, friendship associations, community associations, and common characteristic associations. Common characteristic associations may include, for example, associations based on some characteristic, such as attending the same high school or being from the same hometown, and can indicate a lower level of significance than another type of association, such as a friendship association.

Referring to FIG. 2, edge 220 and edge 222 each comprise an association between profile A at vertex 202 and profile D at vertex 208. The edge 220 represents a business association, and the edge 222 represents a friendship association. Profile A is also associated with profile E by a common characteristic association comprising edge 218. The association between profile A and profile E may be more attenuated than the association between profile A and D, but the association can still be represented by the member network depicted in FIG. 2.

Each member represented by the profiles A, B, C, D, E, F, and G comprising the vertices 202, 204, 206, 208, 210, 212, and 214, respectively, for purposes of illustration, comprises a person. Other types of members can be in member network 200. For example, communities, special interest groups, organizations, political parties, universities, and legal persons, such as corporations and business partnerships may be members of the member network 200. The associations 218, 220, 222, 224, 226, 228, 230, 232, and 234 illustrated in FIG. 2 comprise bi-directional associations. An association between two profiles may comprise a bi-directional association when both parties to the association are associated with each other. For example, in FIG. 2, profile A is associated with profile D, and profile D is also associated with profile A. In one embodiment, profiles A and D will not be bi-directionally associated with each other until both profiles consent to such an association. For example, profile A may invite profile D to be associated therewith, and the bi-directional association occurs upon profile D's acceptance of such invitation. The invitation, for example, may include sending an email or other message to profile D indicating that profile A has requested an association with profile D.

Other embodiments of the present invention may comprise directed associations or other types of associations. Directed associations can associate a first profile with a second profile while not requiring the second profile to be associated with the first profile. For example, profile A can be associated by a friendship association with profile B, and profile B can be unassociated with profile A, or profile B can be associated with profile A through a different type of association, such as a business association. Thus a display of profile A's friends would include profile B, but a display of profile B's friends would not include profile A.

Within a member network, a degree of separation can be determined for associated profiles. In one embodiment, a degree of separation between two profiles can be determined by the fewest number of edges of a certain type separating the associated profiles. In another embodiment, a type-specific degree of separation may be determined. A type-specific degree of separation comprises a degree of separation determined based on one particular type of association. For example, a profile A has a friend association degree of separation of two from profile E. The fewest number of friendship associations between profile A and profile E is two—the friendship association comprising edge 222 between profiles A and D and the friendship association comprising edge 234 between profiles D and E. Thus, for the associated profiles A and E, the degree of friendship separation, determined according to one aspect of one embodiment of the present invention, is two.

Another type-specific degree of separation can also be determined for profiles A and E. For example, a common characteristic degree of separation can be determined by determining the fewest number of common characteristic associations separating profile A and profile E. According to the embodiment depicted in FIG. 2, there is one common characteristic association, comprising edge 218, separating profiles A and E. Thus, the common characteristic association degree of separation, according to the embodiment depicted in FIG. 2, is one. The common characteristic in this example, can be that profile A attended the same high school as profile E. A common characteristic association may be selected by profiles A and E to represent that they are associated in some fashion, but to not create a close association such as with a friendship association.

According to other aspects of certain embodiments of the present invention, the degree of separation may be determined by use of a weighting factor assigned to each association. For example, close friendships can be weighted higher than more distant friendships. According to certain aspects of embodiments using a weighting factor, a higher weighting factor for an association can reduce the degree of separation between profiles and lower weighting factors can increase the degree of separation. This can be accomplished, for example, by establishing an inverse relationship between each associations and a corresponding weighting factor prior to summing the associations. Thus, highly weighted associations would contribute less to the resulting sum that lower weighted associations.

Process

Various methods or processes in accordance with the present invention may be constructed. For example, in one embodiment, the method begins with receiving profiles of users in a member network, wherein the profiles comprise endorsement information of endorsed articles. The endorsement information can include a look-up table listing a search query, an article identifier for an article relevant to the search query, and an endorsement associated with the article identifier. The endorsements come from members of the member network, and they can be binary endorsements of articles, ratings of articles, and/or comments about articles. The method also includes receiving a search query from a user within or outside of the member network and providing a search result set relevant to the search query, wherein one of the article identifiers in the search result set may be endorsed based on the endorsement information. The search query listed in the endorsement information can be substantially identical or relevant to the received search query, and the endorsed article identifier for the search query is the article identifier listed in the endorsement information. The endorsed articles are from members associated with the user that submits the received search query. The associations can be based on profile associations indicated in member profiles and the received search query.

Figure 3A:
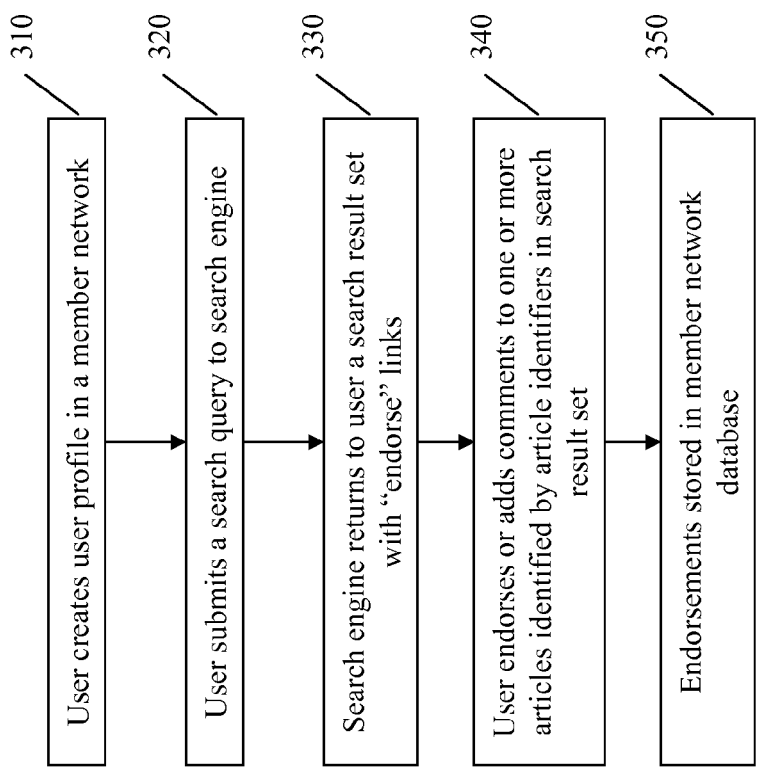
FIGS. 3A-B depict process flows for search endorsements in accordance with an embodiment of the present invention.
Figure 3B:
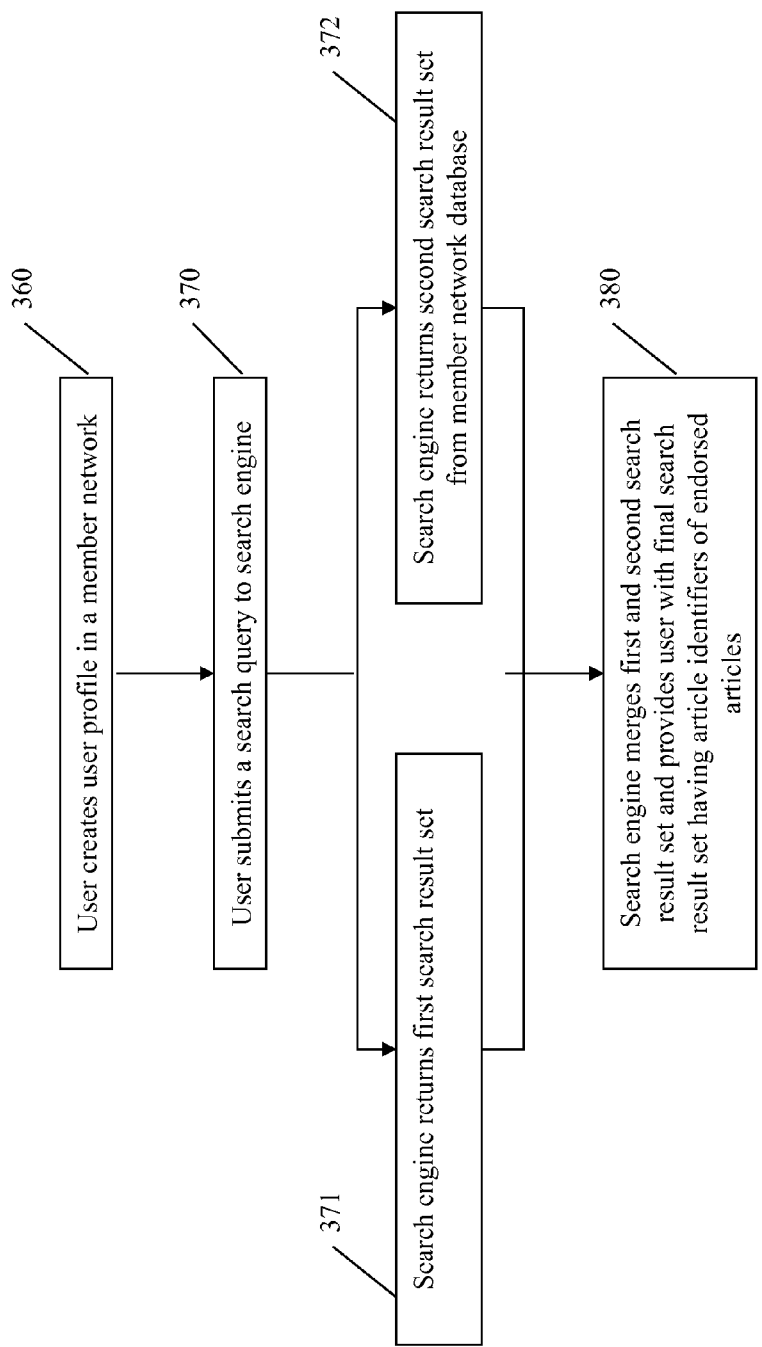

FIGS. 3A-B illustrate an exemplary method that provides article endorsements whereby members can create and share their personalized lists of articles with other members in the member network and/or other users of a search engine. The exemplary method is provided by way of example, as there are a variety of ways to carry out methods according to the present invention. The method shown in FIGS. 3A-B can be executed or otherwise performed by one or a combination of various systems. The method in FIGS. 3A-B is described below as carried out by the system 100 shown in FIG. 1 by way of example, and various elements of the system 100 are referenced in explaining the example method of FIGS. 3A-B.

The method begins at 310 with a user, such as user 112a, joining a member network, such as the member network 200 (e.g., Orkut™), by creating a user or member profile as described earlier.

At 320, the user 112a submits a search query to a search engine, such as the search engine 158 at the search site 152, that is linked to the member network site 160. The user 112a submits the search query by generating a query signal that includes a search query at the client device 102a and transmitting the search query to the server device 152 via the network 106.

At 330, in response to receiving the query signal from the client device 102a, the search engine 158 locates articles from websites, systems, and/or devices that are accessible by the network 106 and returns article identifiers associated with the documents in a search result set. Each article identifier is provided with one or more "endorse" links that enables the user 112a to endorse or recommend the underlying article represented by the article identifier for the particular issued search query. The endorsement/recommendation can be a simple binary endorsement (e.g., a positive or negative endorsement) of the article, a scaling system (e.g., 1 to 5 or A to F to indicate best to worst) for rating the article, and/or other added comments about the article.

At 340, the user 112*a* can endorse an article by accessing the respective "endorse" link(s). For instance, the user 112*a* can click on the "endorse" link and be directed to a navigational page or window, wherein the user 112*a* is presented with the option to either positively endorse (e.g., "Recommended") or negatively endorse (e.g., "Not Recommended") the article. In another instance, the user 112*a* can click on the "endorse" link and be directed to a navigational page or window, wherein the user 112*a* is presented with a scale, e.g., from 1 to 5 to rate the article from best to worse or vice versa. In still another instance, separately or in combination with the aforementioned two instances, the user 112*a* can click on the "endorse" link and be directed to a navigational page or window, wherein the user 112*a* has the option to add comments about the quality of the article.

Alternatively, the user 112*a* can endorse an article without having to first obtain the article from a search query. For instance, the user 112*a* can create a search endorsement entry in his or her member profile, wherein the user 112*a* can input a desired search query for the endorsement, one or more article identifiers that the user 112*a* chooses to endorse for the desired search query, and the kind of endorsement for each of the endorsed article identifiers.

At 350, once the user 112*a* has endorsed one or more articles as represented by their article identifiers in the search result set, the search engine 158 can communicate with the member network engine 168 to store the endorsements in the member profile in the member network database 170. Thus, the member profile of the user 112*a* can include at least the following information: 1) an identifier of the user 112*a* (who can be anonymous); 2) a list of other users in the member network 200 that have one or more associations with the user 112*a* as described earlier; 3) a list of endorsed articles (e.g., URLs) that can be categorized based on search queries (e.g., search terms) previously submitted by the user 112*a*; and/or 4) the endorsements by the user 112*a* for each of the endorsed articles. Alternatively, the endorsements can include the aforementioned information but be stored in a file other than the member profile and yet be associated with the member.

Referring now to FIG. 3B, at 360, another user, such as user 112*b*, submits a search query to the same search site 150. As described earlier with regard to 320, the user 112*b* submits the search query at 370 by generating a query signal that includes a search query at the client device 102*b* and transmitting the search query to the server device 152 via the network 106.

In response to receiving the query signal from the client device 102*b* at 370, the search engine 158 performs two searches: 1) at 371, a regular search similar to 330 in FIG. 3A whereby the search engine 158 locates documents and returns article identifiers associated with the documents in a first search result set; and 2) at 372, a search of the member network database 170 whereby the search engine 158 locates previously endorsed articles for the same search query (or those queries that are relevant to the current search query submitted by the user 112*b* as known in the field of information retrieval) in associated member profiles in a member network and returns them in a second search result set. The search engine 158 searches the member network database 170 by communicating with the server device 162 and its member network engine 168 to identify members in the member network 200 that are associated with the user 112*b* and/or associated with the search query submitted by the user 112*b*. Through the member network engine 168, the search engine 158 can then access the member profiles of those associated members to look up any available list of endorsed articles (via article identifiers) for the same search query submitted by the user 112*b* (or those queries that are relevant to such submitted search query as known in the field of information retrieval).

Thus, the user 112*b* can add a layer of trust on top of the regular search result set. The trust can be in the form of endorsements from those members of the member network 200 that are associated with the user 112*b* because of their explicit profile associations with the user 112*b*, as described earlier with reference to FIG. 2. The trust can also be in the form of endorsements from those members that are associated with the user 112*b* because of their implicit profile associations with the user 112*b* and/or the search query submitted by the user 112*b*. For instance, the search engine 158 and member network engine 168 can identify from member profiles stored in the member network database 170 those members that have the same or similar interests to the user 112*b*, based on a reading of the member profile of the user 112*b* and/or the search query entered by the user 112*b*, and provide the user 112*b* with any endorsements from such implicitly-associated members.

To provide an example, if the user 112*b* is searching for a sushi restaurant in San Francisco, the user 112*b* can receive endorsements from those members that live in the San Francisco area and like Japanese or sushi restaurants or from those members that are food critics in the San Francisco area. To provide another example, if both the users 112*a* and 112*b* are members of a "photography" community within the member network 200, and the user 112*b* is searching for a digital camera, the user 112*b* can receive any endorsements from the user 112*a* and other members of the "photography" community on the kind of digital camera to purchase and/or where to purchase a digital camera. From the present disclosure, one of ordinary skill in the art can see that there are a myriad of criteria that can be used to identify those members that can be implicitly associated with the user 112*b*. Those criteria merely depend on the extent of the information contained in the member profiles for the member network 200 and the search queries entered by the user 112*b* to obtain endorsed articles.

At 380, the search engine 158 then merges the first and second search result sets together to form a final search result set. According to one embodiment of the present invention, any endorsed articles (as represented by their article identifiers) in the final search result set can be ranked differently from other articles in the set and annotated to indicate endorsements. The ranking for each endorsed article can be based on the type and/or degree of associations (implicit or explicit) between the user 112*b* and the member in the member network 200 that has endorsed such article. For instance, the final search result set is the regular first search result set that has been reordered or re-ranked with the article identifiers for the endorsed articles arranged at the top of the list with annotations to indicate endorsements. The user 112*b* can then access the annotations to view all endorsements for each endorsed article and identify the user or users that have endorsed such article. This allows the user 112*b* to appropriately trust the endorsements based on his/her associations (implicit or explicit) with the endorsers. The annotations can accompany the article identifier and be placed in the vicinity of the article identifier (e.g., "endorsed by John Doe" and/or " from John Doe: a great place for buying widgets"). Alternatively, the annotations can be links to pop-up windows or other sites/pages that contain the endorsement language. According to another embodiment of the present invention, the user 112*b* can be automatically redirected to the navigational site of an endorsed article based on the ranking or reordering.

Figure 6A:
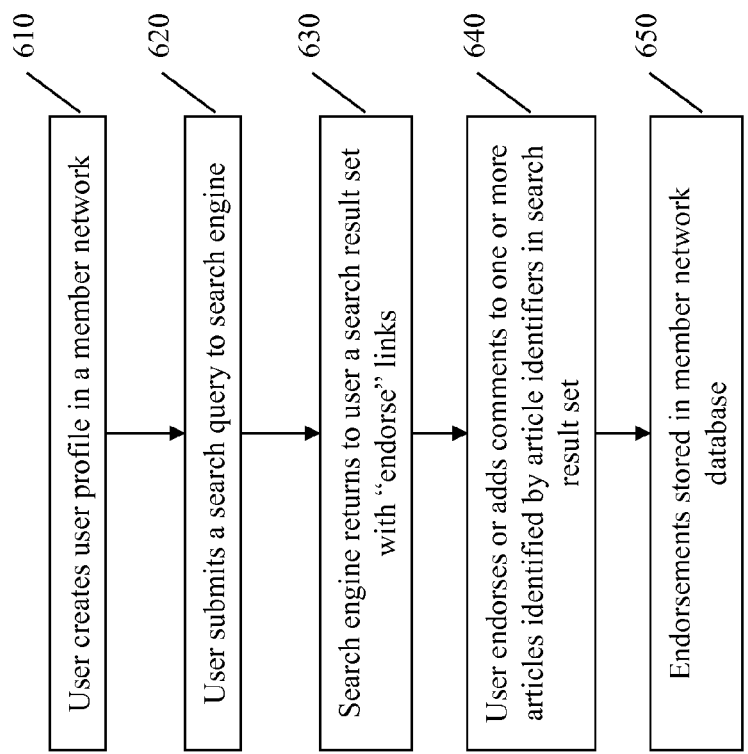
FIGS. 6A-B depict process flows for search endorsements in accordance with another embodiment of the present invention.
Figure 6B:
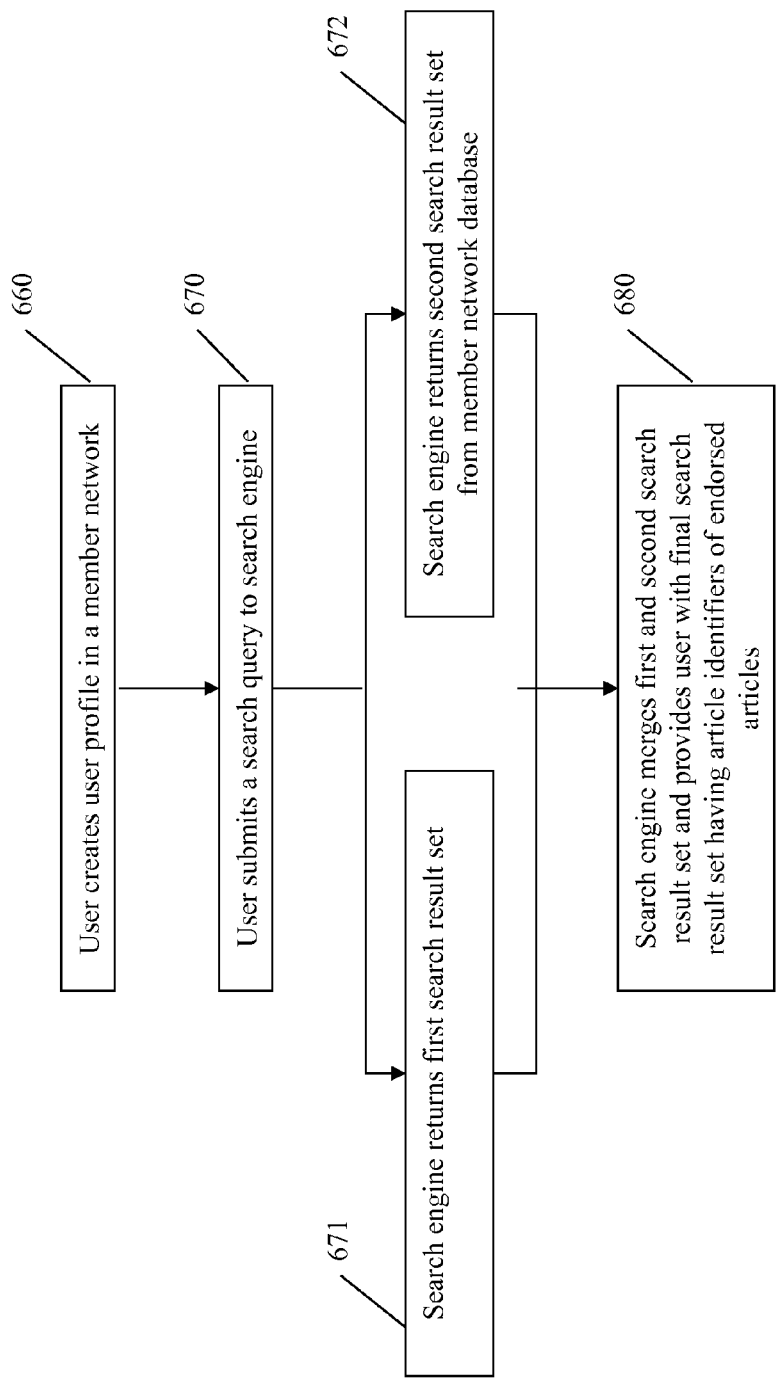

Although the aforementioned embodiments of the present invention have been described with regard to query-dependent endorsements, i.e., endorsed search results are provided based on search queries submitted by a user, it should be understood that query-independent endorsements also can be provided. FIGS. 6A-B illustrate an exemplary method that provides query-independent article endorsements whereby members can create and share their personalized lists of articles with other members in the member network and/or other users of a search engine. The exemplary method is provided by way of example, as there are a variety of ways to carry out methods according to the present invention. The method shown in FIGS. 6A-B can be executed or otherwise performed by one or a combination of various systems. The method in FIGS. 6A-B is described below as carried out by the system 100 shown in FIG. 1 by way of example, and various elements of the system 100 are referenced in explaining the example method of FIGS. 6A-B.

The method begins at 610 and continues at 620 and 630 in a similar manner as described earlier for 310, 320, and 330 in FIG. 3A, respectively.

At 640, similar to 340 in FIG. 3A, the user 112a can endorse an article by accessing the respective "endorse" link(s). For instance, the user 112a can click on the "endorse" link and be directed to a navigational page or window, wherein the user 112a is presented with the option to either positively endorse (e.g., "Recommended") or negatively endorse (e.g., "Not Recommended") the article. In another instance, the user 112a can click on the "endorse" link and be directed to a navigational page or window, wherein the user 112a is presented with a scale, e.g., from 1 to 5 to rate the article from best to worse or vice versa. In still another instance, separately or in combination with the aforementioned two instances, the user 112a can click on the "endorse" link and be directed to a navigational page or window, wherein the user 112a has the option to add comments about the quality of the article.

Alternatively, the user 112a can endorse an article without having to first obtain the article from a search query. For instance, the user 112a can create a search endorsement entry in his or her member profile; wherein, unlike 340 in FIG. 3A, the user 112a does not have to input a desired search query for the endorsement (because the endorsed search result set will be query-independent anyway, although the user 112a can still input a desired search query). Here, the user 112a also can input one or more article identifiers that the user 112a chooses to endorse (without reference to any desired search query), and the kind of endorsement for each of the endorsed article identifiers.

At 650, similar to 350 in FIG. 3A, once the user 112a has endorsed one or more articles as represented by their article identifiers in the search result set, the search engine 158 can communicate with the member network engine 168 to store the endorsements in the member profile in the member network database 170. Thus, the member profile of the user 112a can include at least the following information: 1) an identifier of the user 112a (who can be anonymous); 2) a list of other users in the member network 200 that have one or more associations with the user 112a as described earlier; 3) a list of endorsed articles (e.g., URLs) (which does not have to be categorized based on any search queries); and/or 4) the endorsements by the user 112a for each of the endorsed articles. Alternatively, the endorsements can include the aforementioned information but be stored in a file other than the member profile and yet be associated with the member.

Referring now to FIG. 6B, the method continues at 660, which is similar to 360 in FIG. 3B and described earlier. Next, in response to receiving the query signal from the client device 102b at 670, the search engine 158 performs two searches: 1) at 671, a regular search similar to 630 in FIG. 6A whereby the search engine 158 locates documents and return article identifiers associated with the documents in a first search result set; and 2) at 672, a search of the member network database 170 whereby the search engine 158 locates previously endorsed articles that match with article identifiers contained in the first search result set in associated member profiles in a member network and returns them in a second search result set. The search engine 158 searches the member network database 170 by communicating with the server device 162 and its member network engine 168 to identify members in the member network 200 that are associated with the user 112b. Through the member network engine 168, the search engine 158 can then access the member profiles of those associated members to look up any available list of endorsed articles (via article identifiers) for those articles that match with the article identifiers contained in the first search result set.

Thus, the user 112b can add a layer of trust on top of the regular search result set, even though such layer of trust may be query-independent. The trust can be in the form of endorsements from those members of the member network 200 that are associated with the user 112b because of their explicit profile associations with the user 112b, as described earlier with reference to FIG. 2. The trust can also be in the form of endorsements from those members that are associated with the user 112b because of their implicit profile associations with the user 112b. For instance, the search engine 158 and member network engine 168 can identify from member profiles stored in the member network database 170 those members that have the same or similar interests to the user 112b, based on a reading of the member profile of the user 112b, and provide the user 112b with any endorsements from such implicitly-associated members.

To provide an example, if the user 112b is searching for a sushi restaurant in San Francisco, the user 112b can receive endorsements from those members that live in the San Francisco area and like Japanese or sushi restaurants or from those members that are food critics in the San Francisco are, even though such endorsements contained in the member profiles of those members may not have associated any assigned search queries at all but merely match some of the search results initially returned by the search engine 158. To provide another example, if both the users 112a and 112b are members of a "photography" community within the member network 200, and the user 112b is searching for a digital camera, the user 112b can receive any endorsements from the user 112a and other members of the "photography" community on the kind of digital camera to purchase and/or where to purchase a digital camera, even though such endorsements contained in the member profiles of the user 112a and/or other users are not associated with any assigned search queries at all but merely match some of the search results initially returned by the search engine 158. From the present disclosure, one of ordinary skill in the art can see that there are a myriad of criteria that can be used to identify those members that can be implicitly associated with the user 112b. Those criteria merely depend on the extent of the information contained in the member profiles for the member network 200 as entered by the user 112b to obtain endorsed articles.

At 680, the method continues as described earlier for 380 of FIG. 3B.

FIGS. 3A and 6A have been described with reference to one user, namely, user 112a, and FIGS. 3B and 6B have been described with reference to another user, namely, user 112b. However, it should be noted that these two users can be one and the same. Hence, according to one embodiment of the present invention, each article identifier in the final search result set described in FIG. 3B, regardless of its endorsed or non-endorsed status, can be provided with one or more "endorse" links that enables the user 112*b* to also endorse and/or recommend such article for the submitted search query, just as the user 112*a* is able to do. Further, the user 112*b* can still benefit from search endorsements by members of the member network 200 even when the user 112*b* is not in a member network 200. For example, the search engine 158 and the member network engine 168 can retrieve endorsements from stored member profiles in the member network database 170 that are implicitly associated with the user 112*b* based on the search query submitted by the user 112*b*. In another example, endorsements can be provided to members and/or non-members of a member network when: there is a predetermined sufficient number of endorsements for a particular article by the members; and/or a predetermined quality of endorsements (e.g., a good buy or best buy) for such article by the members.

Consequently, search endorsements according to embodiments of the present invention can be used to personalize the search engine's ranking of articles by offering a way for users to re-rank the articles for themselves, for those associated with them in the member network 200, and/or for other users outside of the member network 200 as well.

According to one embodiment of the present invention, the search endorsements can provide financial opportunities to both the users who endorse articles and the search site that implements the search endorsements. For example, to encourage users to endorse a particular web site as a good article, such web site can offer to pay each endorsing user a financial proceed (e.g., a fee for each click through) for endorsing the site. The search site can also retain a portion of such proceed.

EXAMPLE

Figure 4:
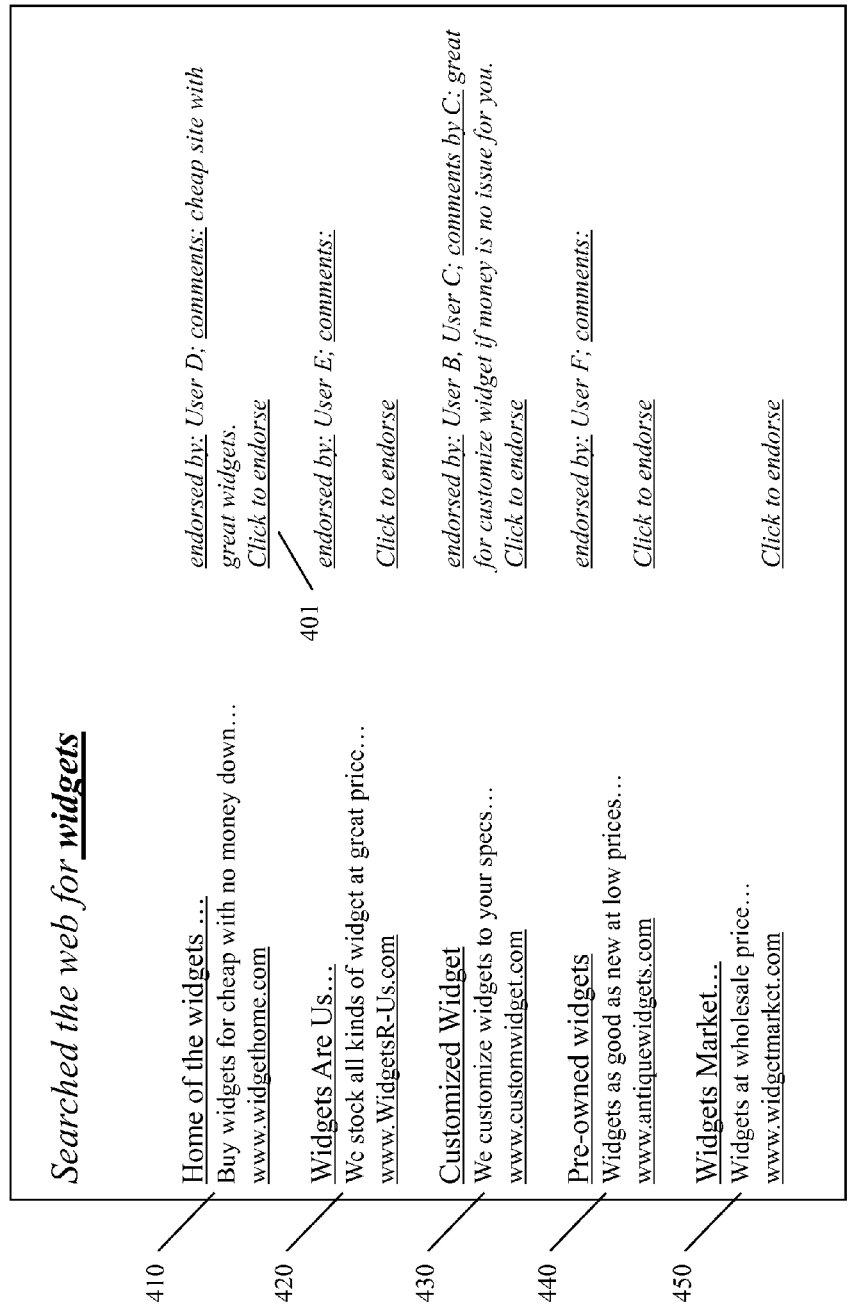
FIG. 4 depicts a sample screenshot of a search result page in accordance with an embodiment of the present invention.
Figure 5:
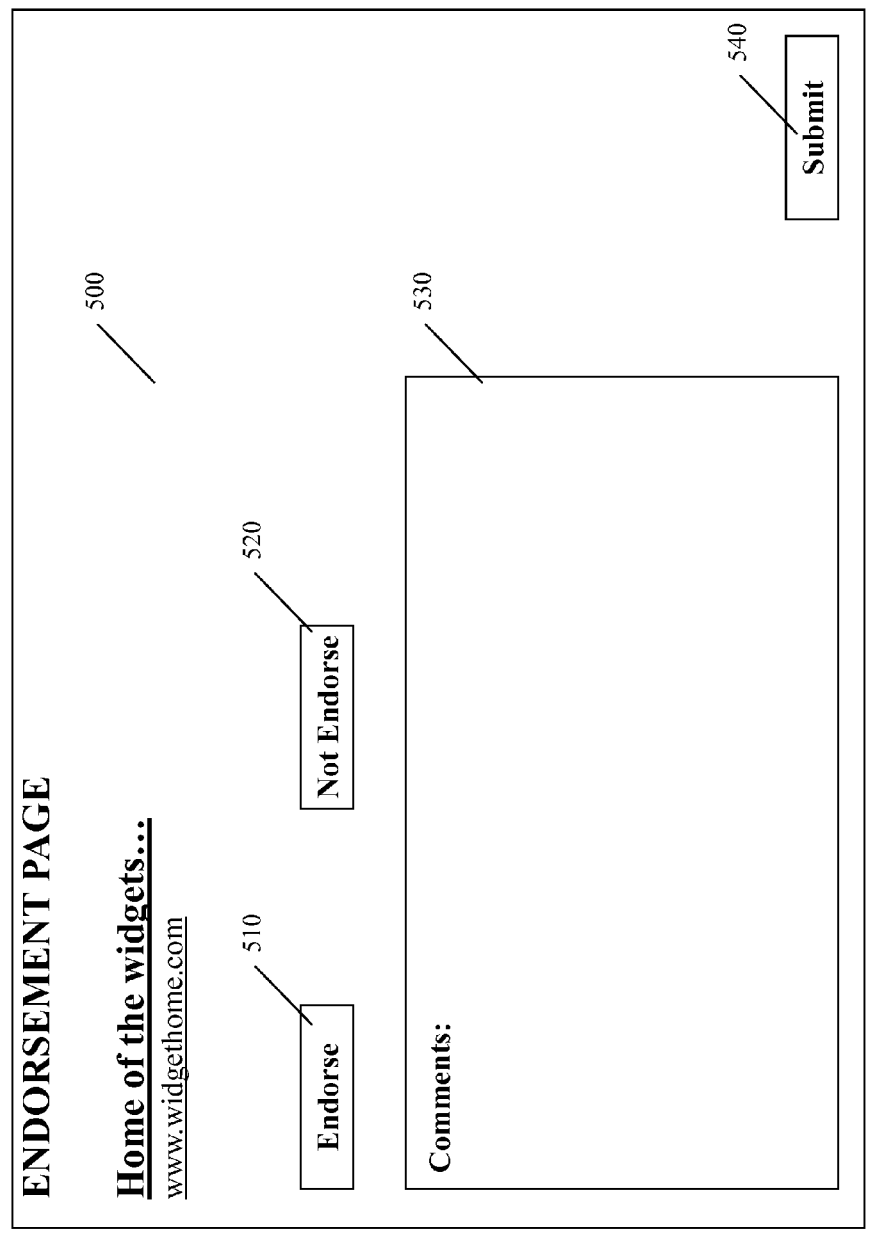
FIG. 5 depicts a sample screenshot of an endorsement page in accordance with an embodiment of the present invention.

Referring to the screenshot in FIG. 4, with reference to FIGS. 1 and 2, an example in accordance with an embodiment of the present invention is now provided. When a user A (who can be, e.g., any one of the users 112*a-n*), having a profile A at vertex 202 in FIG. 2 submits, a search query for, e.g., widgets, to the search engine 158 at the search site 150, the search engine returns a search result set as shown in FIG. 5 to the user A. As shown, the article identifier 410 indicates an endorsement of the underlying article with a comment by a user D (having profile D at vertex 208 in FIG. 2). The article identifier 420 indicates an endorsement of the underlying article by a user E (having profile E at vertex 210 in FIG. 2) with no comments. The article identifier 430 indicates endorsements of the underlying article by users B (having profile B at vertex 204 in FIG. 2) and C (having profile C at vertex 206 in FIG. 2) with comments only from C. The article identifier 440 indicates an endorsement of the underlying article by a user F (having profile F at vertex 212) with no comments. The article identifier 450 indicates no endorsements or comments for the underlying article.

From viewing the search results, the user A can decide to: 1) trust the articles represented by article identifiers 410 and 430 because they are endorsed by friends, user B, C, and D (as shown by the friendship associations 226, 232, and 222, respectively); 2) trust the article represented by article identifier 420 a little less because it is endorsed by a friend of a friend, user E; 3) not trust the article represented by article identifier 440 or 450 because the article represented by article identifier 440 is endorsed by a user F with whom the user A is tenuously associated (a friend F of a friend G of a friend C) and the article represented by article identifier 450 is not endorsed by anyone. Alternatively, if the user F is implicitly associated with the user A based on their member profiles and/or the search query submitted by the user A (e.g., the user F is a widget expert or a lead member of a widget community within the member network 200, or the both the users A and F are members of a widget community or association within the member network 200), the user A can choose to trust the user F's endorsed article. The user A can also trust the article represented by article identifier 430 more than the article represented by article identifier 410 because the user A is associated more with the user B than with the user D (three associations 224, 226, 228 versus two associations 220 and 222, as seen in FIG. 2).

As mentioned earlier, the user A also has an opportunity to provide endorsements to one or more of the articles represented by article identifiers 410, 420, 430, 440, and 450 by accessing the link 501 that accompanies each of the search results.

FIG. 5 shows a sample screenshot 500 of an endorsement page that is provided when the user A accesses the link 401 of the article identifier 410, in accordance with an embodiment of the present invention. As shown, the user A can positively endorse the link by clicking on button 510, negatively endorse the link by clicking on the button 520, and/or add comments in box 530. Once finished, the user A can click on button 640 to end the endorsement process, store the endorsement in his/her member profile in the member network database 170, and return to the search result page shown in FIG. 4. The endorsement by the user A will then be added to the same search result page in a manner similar to the display of endorsements by others in the page.

General

Although the invention has been described with reference to these embodiments, other embodiments could be made by those in the art to achieve the same or similar results. Variations and modifications of the present invention will be apparent to one skilled in the art based on the present disclosure, and the present invention encompasses all such modifications and equivalents.

The invention claimed is:

1. A computer-implemented method comprising:
   receiving, by a computer system comprising one or more servers from particular members of a member network, machine-readable endorsement information that characterizes the particular members' ratings of various articles;
   receiving member profile information specifying that one or more members of the member network are experts in one or more respective fields;
   receiving, by the computer system, a first search query from a first user in the member network;
   determining, by the computer system, that the first search query relates to a particular field;
   identifying, from an article index by the computer system, a first plurality of articles that are responsive to the first search query;
   identifying, by the computer system from profile information of the members of the member network, one or more experts in the member network that are each an expert in the particular field to which the computer system determined the first search query relates;
   identifying, from a repository of member network data for the member network, a second plurality of articles that are responsive to the first search query and that have been endorsed by particular members in the member network, wherein the repository of member network data is different from the article index;
determining that a first article in the second plurality of articles has been endorsed by an expert in the one or more experts in the member network who are each an expert in the particular field to which the computer system determined the first search query relates;
generating, by the computer system, a plurality of article identifiers for articles that include articles from the first and second pluralities of articles;
ranking, by the computer system, using the endorsements for articles in the second plurality of articles, the first article that has been endorsed by the expert in the particular field to which the first search query relates with a higher ranking than a second article that was not endorsed by an expert in the particular field to which the first search query relates; and
responding, by the computer system, to the first search query with the plurality of article identifiers according to the ranking including a first article identifier for the first article and a second article identifier for the second article.

2. The method of claim 1, comprising:
receiving profiles of the members in the member network, wherein each of the profiles includes machine-readable endorsement information submitted by the respective member that characterizes the respective member's ratings of various articles, wherein at least one of the profiles identifies the corresponding member in the member network that provided the respective endorsement information as an expert in the particular field.

3. The method of claim 1, comprising receiving machine-readable endorsement information that characterizes members' ratings of various articles, wherein the members are members in the member network by:
receiving a collection of search queries submitted by one or more members in the member network;
receiving a collection of article identifiers identifying articles that are responsive to the search queries;
receiving a collection of numeric ratings of at least one of the articles identified by the article identifiers; and
updating, for each of the one or more members in the member network, corresponding profile information using numeric ratings from the collection of numeric ratings and the article identifiers for the articles rated by the corresponding member.

4. The method of claim 3, wherein receiving the collection of search queries submitted by the one or more members in the member network comprises receiving at least one search query that is identical to the first search query.

5. The method of claim 3, wherein receiving the collection of search queries submitted by the one or more members in the member network comprises receiving search queries that are relevant to the first search query.

6. The method of claim 3, wherein receiving a collection of the numeric ratings of the at least one of the articles each comprises receiving one or more of:
a binary positive or negative rating,
a scaled grade, or
a comment characterizing a member's rating of an article.

7. The method of claim 1, comprising:
receiving machine-readable endorsement information that characterizes members' ratings of various articles, wherein the members are members in the member network and some of the endorsement information identifies the corresponding member in the member network that provided the respective endorsement information as an expert in the particular field; and
providing a first member from the member network with a financial incentive in response to an endorsement of a particular article in the second plurality of articles.

8. The method of claim 1, comprising:
receiving machine-readable endorsement information that characterizes members' ratings of various articles, wherein the members are members in the member network and some of the endorsement information identifies the corresponding member in the member network that provided the respective endorsement information as an expert in the particular field; and
determining that a first member of the member network other than the first user has endorsed a particular article in the second plurality of articles, wherein the endorsement information comprises an article identifier that identifies the particular article and the first member's rating of the particular article.

9. The method of claim 1, comprising receiving machine-readable endorsement information that characterizes members' ratings of various articles independent of any search query, wherein the members are members in the member network and some of the endorsement information identifies the corresponding member in the member network that provided the respective endorsement information as an expert in the particular field.

10. The method of claim 1, comprising receiving machine-readable endorsement information that characterizes members' ratings of various articles based on a scaled grade, wherein the members are members in the member network and some of the endorsement information identifies the corresponding member in the member network that provided the respective endorsement information as an expert in the particular field.

11. The method of claim 1, comprising:
determining that a first member of the member network other than the first user has endorsed a particular article in the second plurality of articles, wherein the plurality of article identifiers includes an identifier for the particular article;
determining, from among a plurality of different types or degrees of associations between the members in the member network, a particular type or degree of an association in the member network between the first user and the first member; and
ranking articles that correspond with the plurality of article identifiers using the particular type or degree of the association in the member network between the first member and the first user, wherein responding to the first search query with the plurality of article identifiers comprises formatting a response in an arrangement that corresponds to the ranking of the articles using the particular type or degree of the association in the member network between the first member and the first user.

12. The method of claim 11, wherein determining that the first member of the member network other than the first user has endorsed the particular article in the second plurality of articles comprises determining that the first member's endorsement of the particular article comprises a comment characterizing the first member's rating of the particular article.

13. The method of claim 11, wherein determining the particular type or degree of the association in the member network between the first user and the first member comprises determining a degree of the association in the member network between the first member and the first user that indicates a number of intermediate relationships that separate the first member and the first user.

14. The method of claim 11, wherein determining the particular type or degree of the association in the member network between the first user and the first member comprises determining an association between the first user and the first member that comprises one of a friendship association, a business association, a family association, a community association, or a school association.

15. The method of claim 11, comprising:
determining a level of the particular type of association in the member network between the first user and the first member, the level indicating a relative strength of the particular type of association between the first user and the first member; and
ranking the articles in the plurality of articles using the level of the particular type of association in the member network between the first user and the first member.

16. The method of claim 11, wherein determining that the first member has endorsed the particular article in the second plurality of articles includes selecting the first member from among a plurality of members in the member network based on the first member being associated with the first user in the member network or based on the first member being associated with the first search query.

17. The method of claim 11, wherein ranking the articles in the plurality of articles comprises re-ranking an order of the articles in the first plurality of articles that are included in the plurality of articles using the first member's endorsement of the particular article.

18. The method of claim 17 wherein re-ranking the order of the articles in the first plurality of articles that are included in the plurality of articles comprises ranking the particular article above another article for which endorsement information has not been received when, in the absence of the first member's endorsement of the particular article, the other article would be more relevant to the first search query than the particular article such that the other article would be ranked above the particular article.

19. The method of claim 1, wherein identifying the one or more experts in the member network that are each an expert in the particular field to which the computer system determined the first search query relates comprises determining that at least one of the one or more experts in the member network is an expert in the particular field using corresponding professional information or corresponding educational information in the profile information for the corresponding expert.

20. The method of claim 1, comprising receiving a machine-readable endorsement of the first article by the expert in the member network who is an expert in the particular field.

21. A system comprising:
one or more computers and one or more storage devices storing instructions that are operable, when executed by the one or more computers, to cause the one or more computers to perform operations comprising:
receiving, from particular members of a member network, machine-readable endorsement information that characterizes the particular members' ratings of various articles;
receiving member profile information specifying that one or more members of the member network are experts in one or more respective fields;
receiving a first search query from a first user in the member network;
determining that the first search query relates to a particular field;
identifying, from an article index, a first plurality of articles that are responsive to the first search query;
identifying, from profile information of the members of the member network, one or more experts in the member network that are each an expert in the particular field to which the first search query relates;
identifying, from a repository of member network data for the member network, a second plurality of articles that are responsive to the first search query and that have been endorsed by particular members in the member network, wherein the repository of member network data is different from the article index;
determining that a first article in the second plurality of articles has been endorsed by an expert in the one or more experts in the member network who are each an expert in the particular field to which the first search query relates;
generating a plurality of article identifiers for articles that include articles from the first and second pluralities of articles;
ranking, using the endorsements for articles in the second plurality of articles, the first article that has been endorsed by the expert in the particular field to which the first search query relates with a higher ranking than a second article that was not endorsed by an expert in the particular field to which the first search query relates; and
responding to the first search query with the plurality of article identifiers according to the ranking including a first article identifier for the first article and a second article identifier for the second article.

22. A non-transitory computer storage medium encoded with instructions that, when executed by one or more computers, cause the one or more computers to perform operations comprising:
receiving, from particular members of a member network, machine-readable endorsement information that characterizes the particular members' ratings of various articles;
receiving member profile information specifying that one or more members of the member network are experts in one or more respective fields;
receiving a first search query from a first user in the member network;
determining that the first search query relates to a particular field;
identifying, from an article index, a first plurality of articles that are responsive to the first search query;
identifying, from profile information of the members of the member network, one or more experts in the member network that are each an expert in the particular field to which the first search query relates;
identifying, from a repository of member network data for the member network, a second plurality of articles that are responsive to the first search query and that have been endorsed by particular members in the member network, wherein the repository of member network data is different from the article index;
determining that a first article in the second plurality of articles has been endorsed by an expert in the one or more experts in the member network who are each an expert in the particular field to which the first search query relates;

generating a plurality of article identifiers for articles that include articles from the first and second pluralities of articles;

ranking, using the endorsements for articles in the second plurality of articles, the first article that has been endorsed by the expert in the particular field to which the first search query relates with a higher ranking than a second article that was not endorsed by an expert in the particular field to which the first search query relates; and responding to the first search query with the plurality of article identifiers according to the ranking including a first article identifier for the first article and a second article identifier for the second article.

* * * * *